United States Patent
Fries et al.

(10) Patent No.: US 8,849,443 B2
(45) Date of Patent: Sep. 30, 2014

(54) CONTROL OF AN EXPANDED DRYING SECTION OF A PAPER MACHINE

(75) Inventors: Edgar Fries, Neunkirchen am Brand (DE); Johannes Reinschke, Nürnberg (DE); Albrecht Sieber, Möhrendorf (DE); Friedrich Speth, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 391 days.

(21) Appl. No.: 13/254,901

(22) PCT Filed: Jan. 14, 2010

(86) PCT No.: PCT/EP2010/050394
§ 371 (c)(1),
(2), (4) Date: Sep. 6, 2011

(87) PCT Pub. No.: WO2010/099994
PCT Pub. Date: Sep. 10, 2010

(65) Prior Publication Data
US 2012/0004756 A1    Jan. 5, 2012

(30) Foreign Application Priority Data
Mar. 4, 2009 (DE) .......................... 10 2009 011 217

(51) Int. Cl.
*G06F 19/00* (2011.01)
*G06F 7/66* (2006.01)
*D21F 5/20* (2006.01)
*D21G 9/00* (2006.01)
*D21F 5/00* (2006.01)

(52) U.S. Cl.
CPC .. *D21F 5/00* (2013.01); *D21F 5/20* (2013.01); *D21G 9/0036* (2013.01)

USPC ............................ 700/128; 700/122; 700/127

(58) Field of Classification Search
USPC ......................................... 700/122, 127, 128
See application file for complete search history.

(56) References Cited

U.S. PATENT DOCUMENTS

| 3,654,075 A | 4/1972 | Keyes et al. ................... 162/254 |
| 3,815,254 A | 6/1974 | Mills ............................... 34/446 |

(Continued)

FOREIGN PATENT DOCUMENTS

| CN | 101048547 A | 10/2007 | ............... D21F 5/00 |
| DE | 3741128 A1 | 6/1988 | ............... D21F 5/00 |

(Continued)

OTHER PUBLICATIONS

Chinese Office Action, Application No. 201080010299.9, 9 pages, Aug. 5, 2013.

(Continued)

*Primary Examiner* — Ronald Hartman, Jr.
(74) *Attorney, Agent, or Firm* — King & Spalding L.L.P.

(57) ABSTRACT

In order to achieve an improved or optimized operation mode of an "expanded drying section" of a paper machine—having the "actual" drying section, separated, if applicable, into pre-drying and post-drying sections with a size press located therebetween, a steam and condensate system, an exhaust air heat recovery system, a wet press and the white water—a model that includes the above system components is proposed, with which mass and energy balances for the system components as well as the specific energy consumption of the drying section are calculated, based on values for parameters relevant for the drying process.

20 Claims, 1 Drawing Sheet

(56) References Cited

U.S. PATENT DOCUMENTS

| | | | |
|---|---|---|---|
| 6,577,916 B1* | 6/2003 | Gehr et al. | 700/129 |
| 6,584,703 B1* | 7/2003 | Maenpaa et al. | 34/446 |
| 7,811,414 B2* | 10/2010 | Sundqvist et al. | 162/198 |
| 2004/0122547 A1* | 6/2004 | Seymour et al. | 700/117 |
| 2010/0082120 A1* | 4/2010 | Stephenson et al. | 700/29 |

FOREIGN PATENT DOCUMENTS

| | | | | |
|---|---|---|---|---|
| DE | 19612155 A1 | 11/1996 | | D21G 9/00 |
| DE | 19882466 T1 | 5/2000 | | D21F 5/20 |
| DE | 60105421 T2 | 9/2005 | | D21G 9/00 |
| WO | 98/56986 A1 | 12/1998 | | D21F 5/20 |
| WO | 00/34572 A1 | 6/2000 | | D21F 5/00 |
| WO | 01/75222 A2 | 10/2001 | | D21G 9/00 |
| WO | 2006/051157 A2 | 5/2006 | | D21F 5/00 |
| WO | 2010/099994 A2 | 9/2010 | | D21F 5/00 |

OTHER PUBLICATIONS

Dittmar et al., "Modellbasierte prädiktive Regelung in der industriellen Praxis" [Model-based predictive control in industrial practice], Automatisierungstechnik, vol. 54, Issue 12, p. 590-601 (45 pages) (English translation included), Dec. 2006.

International Search Report and Written Opinion for Application No. PCT/EP2010/050394 (12 pages), Oct. 5, 2010.

Paulonis, Michael A. et al., "Adaptive Inferential Control of Kraft Batch Digesters as Based on Pulping Liquor Analysis," Tappi Journal, 7 pages, Jun. 1991.

Krischer, O. et al., "The Scientific Principles of Drying Technology," Springer-Verlag Heidelberg, 27 pages (German w/ English translation), 1992.

Murphy, Timothy F. et al., "Intelligent Control for Paper Machine Moisture Control," Proceedings of the 1996 IEEE International Conference on Control Applciations, 8 pages, 1996.

Fisera, Peter et al., "Advanced Coating Technology Experience," 1999 Coating Conference, 4 pages, 1999.

Andritz, BrainWave Control Solutions for Pulp and Paper, 21 pages, Jun. 2002.

Dhak, Janice et al., "Developing a Generic Method for Paper Mill Optimization," Control Systems 2004 Conference, 9 pages, 2004.

Hauge, Tor Anders et al., "Application and Roll-Out of Infinite Horizon MPC Employing a Nonlinear Mechanistic Model to Paper Machines," Journal of Process Control, No. 15, 13 pages, May 6, 2004.

Lindell, K. et al., "A Modular Process Modeling Tool for the Analysis of Energy Use and Cost in the Pulp and Paper Industry," Drying Technology, vol. 24, 11 pages, 2006.

Slätteke, Ola, "Modeling and Control of the Paper Machine Drying Section," Ph.D. Thesis, Department of Automatic Control. Lund University, 241 pages, Jan. 2006.

Akesson, Johan et al., "A Modelica Library for Paper Machine Dryer Selection Modeling—Dry Lib—and Applcations," Department of Automatic Control, Lund University, 31 pages, Aug. 2006.

Akesson, Johan et al., "Modeling, Calibration and Control of a Paper Machine Dryer Selection," The Modelica Association, Modelica 2006, 10 pages, Sep. 4, 2006.

Kädant Johnson, Dryer Management System, 4 pages, 2007.

Akesson, Johan, "Languages and Tools for Optimization of Large-Scale Systems," Ph.D. Thesis, Department of Automatic Control. Lund University, 322 pages, Nov. 2007.

Dahlquist, Erik, *Use of Modeling and Simulation in Pulp and Paper Industry*, book, ch. 5 & 10, 39 pages, 2008.

Andritz Automation, Automation Solutions to Help You Achieve Operational Readiness, 41 pages, 2012.

Crotty, Steve, Declaration, 1 page, Aug. 8, 2013.

Fisera, Peter, Legal Confirmation, Consulting Fisera, 3 pages, Aug. 14, 2013.

Principle diagrams of a paper machine and of a pulp drying machine as block diagrams, and comparison of the two machines, 3 pages.

* cited by examiner

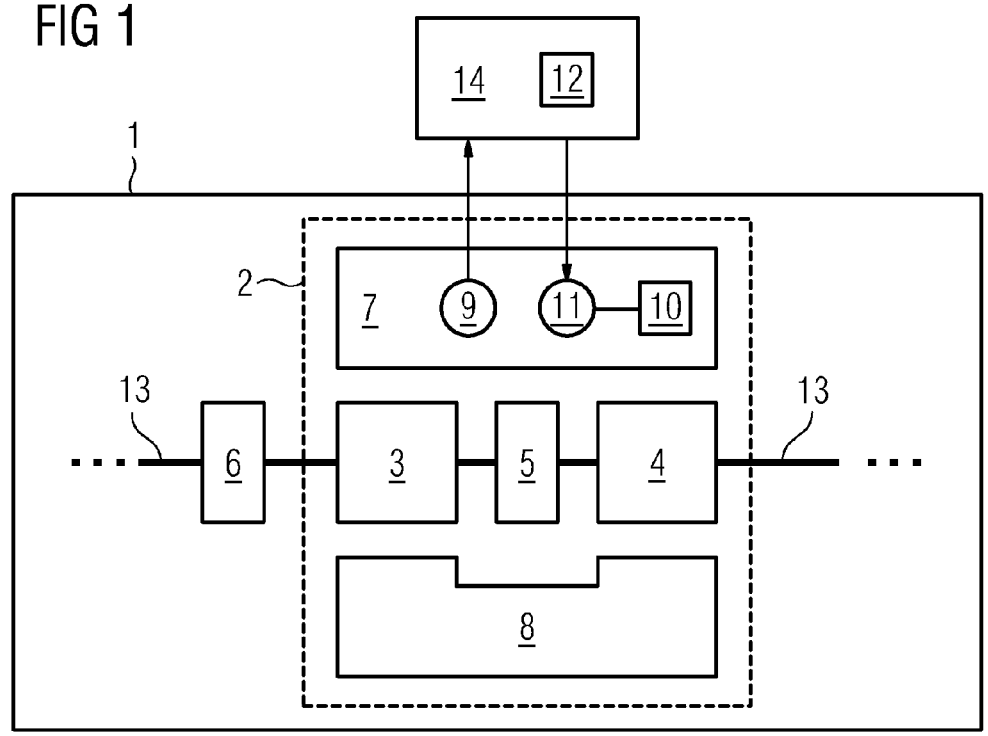
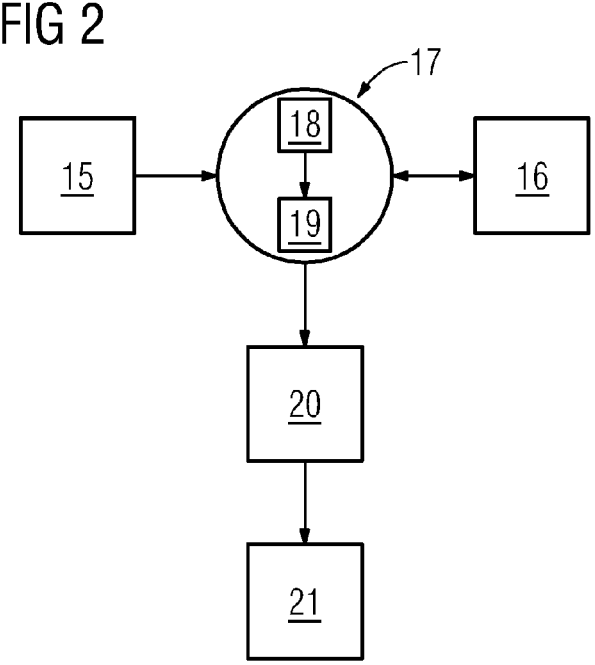

CONTROL OF AN EXPANDED DRYING SECTION OF A PAPER MACHINE

CROSS-REFERENCE TO RELATED APPLICATIONS

This application is a U.S. National Stage Application of International Application No. PCT/EP2010/050394 filed Jan. 14, 2010, which designates the United States of America, and claims priority to German Application No. 10 2009 011 217.0 filed Mar. 4, 2009, the contents of which are hereby incorporated by reference in their entirety.

TECHNICAL FIELD

The invention relates to a method and to a model-based controller for controlling at least one part of a paper machine, to a paper machine having such a controller, to a computer program for carrying out the method according to the invention, and to a computer program product on which the computer program according to the invention is stored.

BACKGROUND

In particular in the drying section of a paper machine, a great deal of energy is needed to dry the paper web—an increase in the energy efficiency of the drying section can have a significant effect on the overall production costs. Occasionally, the drying section is also the "bottleneck" with respect to the throughput of the plant, i.e. the throughput can be raised by means of improved drying.

In order to save energy, it is known to use intelligent controllers, such as the "Dryer Management System" from Kadant Johnson, which models the drying in the actual drying section, substantially comprising drying cylinders and dryer hood, of a paper machine.

SUMMARY

According to various embodiments, improved or optimized operation of an "expanded drying section" of a paper machine can be permitted.

According to an embodiment, in a method for controlling at least one part of a paper machine, containing an online model of the plant units
drying section, possibly subdivided into pre-dryer section and after-dryer section with size press located in between,
heat recovery system,
steam and condensate system,
optionally additionally containing the plant unit wet press and optionally additionally the plant unit white water temperature control,
a distinction is drawn in the online model between the four material streams
moist paper,
moist air,
steam and condensate mixture of highly pure water,
process water with different glycol contents,
in the online model, a mass and energy balance for all the material streams is calculated in each case in
the drying section,
the heat recovery system and
the steam and condensate system,
the specific energy consumption is calculated from the mass and energy balances and
the mass and energy balances and/or the specific energy consumption are displayed.

According to a further embodiment,
values can be calculated for the material stream "moist paper" in relation to the parameters comprising
temperature,
mass flow,
absolute humidity,
relative humidity;
for the material stream "moist air" in relation to the parameters comprising
temperature,
volume flow,
mass flow,
energy flow,
absolute humidity,
relative humidity,
dew point;
for the material stream "steam and condensate" in relation to the parameters comprising
temperature,
pressure,
percentage of steam,
mass flow,
energy flow;
for the material stream "process water" in relation to the parameters comprising
temperature,
mass flow,
energy flow.

According to a further embodiment, a computed value of at least one parameter in the online model can be assigned to the measured value from an associated sensor and the online model is adapted by means of a comparison between computed value and measured value.

According to a further embodiment,
paper machine-specific influences on the drying of a paper web of at least one of the parameters may comprise
temperature and humidity of process feed air,
temperature and humidity of process exhaust air,
white water temperature,
machine speed,
steam pressures in main steam groups and
differential pressures relating to secondary steam groups are modeled and
set points can be calculated for at least one of these parameters.

According to a further embodiment, the value of at least one parameter can be fixed and, for the parameters the values of which are not fixed, set points are determined by means of an optimization algorithm, in particular to optimize a weighted mean between specific energy consumption and throughput. According to a further embodiment, for at least one of the parameters a value range can be predefined, within which a predefinable number of values is fixed successively, and for the parameters the values of which are not fixed, for each of the values within the value range, in each case set points are determined by means of an algorithm in order to optimize a weighted mean between specific energy consumption and throughput. According to a further embodiment, the set points can be calculated at regular time intervals or upon a request from a plant manager. According to a further embodiment, at least one set point can be automatically predefined to an actuating element assigned to the appropriate parameter or an associated control device of a DCS ("Distributed Control System") of the paper machine. According to a further embodiment, a variation over time of at least one set point can be calculated with the aid of a model-predictive optimization algorithm. According to a further embodiment, plant limits or parameter value limits can be generated from calculated variables or variables derived from the online model and/or can be fixedly predefined and/or can be predefined by the plant manager and these plant limits or parameter value limits can be taken into account when calculating a set point. According to a further embodiment, at least one sensor assigned to a parameter measures the parameter value and wherein, in the event of a deviation of the measured value from the computed value of the parameter, a warning signal can be output.

According to another embodiment, a model-based controller for controlling at least one part of a paper machine, may have means for carrying out a method as described above.

According to yet another embodiments, a paper machine may have at least one controller as described above.

According to yet another embodiment, a computer program may carry out a method described above when it is executed in a controller as described above.

According to yet another embodiment, a computer program product may store a computer program as described above.

BRIEF DESCRIPTION OF THE DRAWINGS

In the following, the invention will be described and explained in more detail by using the exemplary embodiments illustrated in the figures, in which:

FIG. 1 shows a schematic representation of the modeled parts of the plant of a paper machine, FIG. 2 shows a diagrammatic representation of the method according to various embodiments.

DETAILED DESCRIPTION

Here, "expanded drying section" is understood to mean:
the "actual" drying section, substantially comprising drying cylinders and dryer hood and possibly subdivided into pre-dryer section and after-dryer section with size press located in between;
if appropriate, the size press;
the steam and condensate system;
the exhaust heat recovery system;
the wet press;
the white water, in particular the white water temperature regulated by the use of fresh steam.

"Improved" or "optimized" operation is understood to mean operation which reduces the specific energy consumption (=tonnes of steam per tonne of paper produced) and/or increases the throughput (=tonnes of paper produced per hour) and/or increases the production rate over a longer time period (=tonnes of paper produced per week or month). The last criterion "increasing the production rate" can be achieved by increasing the throughput and/or increasing the production time or the plant availability, that is to say by improving what is known as the "runnability".

According to various embodiments, in a method for controlling at least one part of a paper machine, containing an online model of the plant units
drying section, possibly subdivided into pre-dryer section and after-dryer section with size press located in between,
heat recovery system,
steam and condensate system, optionally additionally containing an online model of the plant unit
wet press and/or
white water temperature control,
a distinction is drawn in the online model between the four material streams
moist paper,
moist air,
steam and condensate mixture of highly pure water,
process water with different glycol contents,
in the online model, a mass and energy balance for all the material streams is calculated in each case in
the drying section,
the heat recovery system and
the steam and condensate system,
the specific energy consumption is calculated from the mass and energy balances and
the mass and energy balances and/or the specific energy consumption are represented—preferably graphically and/or in tabular form—and/or displayed.

The method according to various embodiments is based on an online model of the complete "expanded drying section" with the units already mentioned—to the extent that these are present in the actual plant.

The system known from the prior art models only the drying in the pre-dryer and after-dryer section but does not contain any models of the following units or phenomena:
white water heating,
the influence of the wet press on the paper web drying,
steam and condensate system,
system for heat recovery from moist exhaust air.

The method according to various embodiments for controlling at least the (expanded) drying section is, on the other hand, based on a model of the pre-dryer and after-dryer section and the size press, the wet press, the steam and condensate system, the heat recovery system and the white water heating, since a further reduction in the specific energy consumption can be achieved only by a model-based control system of which the model comprises a part of the plant (or as many parts of the plant) expanded in this way.

The properties of the various material streams are also incorporated into the model. The moist fibrous mat—arising at the start of the papermaking—and the moist paper are in each case modeled as a fiber-water mixture. The properties of moist air (feed air and exhaust air from the paper drying), of highly pure water vapor and condensate mixture and of process water (possibly with glycol added) can, on the other hand, also be stored in tabular form, for example.

A reduction in the specific energy consumption (=tonnes of steam per tonne of paper produced) can of course be achieved here not just by a reduction in the energy consumption with the same throughput of the paper machine but also by an increase in the throughput with the same energy consumption. Ideally, both conditions can be arranged to be satisfied simultaneously for a reduced specific energy consumption, which means that a higher throughput is achieved with a lower use of energy.

The method according to various embodiments can be used for off-line "what, when?" calculations. By means of calculating the respective mass and energy balances and the specific energy consumption, the effects of a change on the energy consumption can be simulated in a straightforward manner.

The calculated mass and energy balances and/or the associated specific energy consumption are displayed—in particular by means of graphic and/or tabular representation. Here, the physical unit can advantageously be chosen by the user, that is to say for example whether a specific mass stream is to be displayed in tonnes per hour or in kilograms per second.

For the graphic representation, the calculated values are advantageously logged in a schematic representation of the part or parts of the plant of the paper machine relating to the values to be represented in the immediate vicinity of the relevant component. By means of this association, the relevant (partial) results for the respective component, for example the size press, can be seen by an observer "at a glance". To improve the clarity of the graphic representation, it is further advantageous to represent only a selection—to be made by the operator—from the results. For instance, only the results for the pre-dryer and after-dryer section and the size and wet press relating to the paper web can be displayed in a first view, the results relating to the hood air can be displayed in a second view, and the results relating to the application of size can be displayed in a third view. In further views, the results, for example for the steam and condensate system of the pre-dryer and after-dryer section, respectively, can be displayed in an appropriate schematic drawing.

Here, it is not necessary for the results to be plotted in the drawing as an absolute value, they can also be represented graphically, for example in the form of a bar diagram, or relate in percentage terms to the current actual values from the paper machine, for example for "what-if?" calculations.

In one form of the configuration, values are calculated for the material stream "moist paper" in relation to the parameters comprising temperature, mass flow, absolute humidity, relative humidity; for the material stream "moist air" in relation to the parameters comprising temperature, volume flow, mass flow, energy flow, absolute humidity, relative humidity, dew point; for the material stream "steam and condensate" in relation to the parameters comprising temperature, pressure, percentage of steam, mass flow, energy flow; for the material stream "process water" in relation to the parameters comprising temperature, mass flow and energy flow. It is particularly advantageous if, in addition to the results represented—mass and energy balances and/or specific energy consumption—still further variables, such as temperature and density of the paper web to be dried, are also incorporated into the representation—be it graphic or in the form of a tabular overview. Likewise, it is of particularly great advantage if account is taken of the fact that pre-dryer and/or after-dryer section normally comprise a plurality of drive groups, in each case a mass and energy balance being calculated for each drive group. Thus, various embodiments not only permits detection of potential savings but also leads to an improvement in the understanding of the plant. Here, an overview of the plant helps to identify or diagnose units that are damaged or should be serviced (such as heat exchangers becoming blocked), faulty instrumentation (e.g. flow and differential pressure measurement on a valve do not match each other) or unfavorable operation (e.g. when bypass steam valves which should be closed during normal production are nevertheless open).

In a further embodiment, a computed value of at least one parameter in the online model is assigned to the measured value from an associated sensor and the online model is adapted by means of a comparison between computed value and measured value. For example, the mass transfer coefficient in the Stefan equation is adapted, so that calculated and measured paper moisture after the drying section agree.

In a further embodiment, paper machine-specific influences on the drying of a paper web of at least one of the parameters comprising temperature and humidity of process feed air, temperature and humidity of process exhaust air, white water temperature, machine speed, steam pressures in main steam groups and differential pressures relating to secondary steam groups are modeled and set points are calculated for at least one of these parameters. Thus, by using the method according to various embodiments, variables such as those mentioned can be set optimally. Depending on the equipment level of the paper machine, it is also possible—if present—for example for the use of a steam blower box in the wet press to be taken into account or adjusted. So-called "breaks" in the paper web generally take place in the "expanded drying section" which, according to the above definition, also includes the wet press and the size press in addition to the actual drying section. As a result of improved "runnability", the number of breaks can be reduced and thus the production time can be increased and the production rate can be raised. In a further embodiment, the value of at least one parameter is fixed and, for the parameters the values of which are not fixed, set points are determined by means of an optimization algorithm. The optimization algorithm can optimize a weighted mean between specific energy consumption and throughput. In this way, two important objectives in papermaking—increasing the energy efficiency and throughput can be pursued simultaneously in a balanced manner. Alternatively, the specific energy consumption or the throughput can also be optimized in each case on their own.

In a further embodiment, for at least one of the parameters a value range is predefined, within which a predefinable number of values is fixed successively, and for the parameters the values of which are not fixed, for each of the values within the value range, in each case set points are determined by means of an algorithm in order to optimize a weighted mean between specific energy consumption and throughput. In this way, "suggestions" for the overall value range can be made in one step. In addition, an operator (plant manager) can in this way easily detect the effects which changes in a parameter have on the calculated set points of the other parameters.

In a further embodiment, the set points are calculated at regular time intervals or upon a request from a plant manager. The time intervals can depend on the process dynamics of the modeled part of the plant and are typically between 10 and 60 seconds, in particular 30 seconds.

In a further embodiment, at least one set point is automatically predefined to an actuating element assigned to the appropriate parameter or an associated control device of a DCS ("Distributed Control System") of the paper machine. Thus, the method according to various embodiments can not only "suggest" optimized set points, which can, for example, be confirmed by a plant manager or merely accepted as a trend, but can also be used directly as a "control method" with regard to the calculated set points. Here, the set points can be predefined directly to an actuating element although, as a rule, they are supplied to a control device belonging to the DCS.

In a further embodiment, a variation over time of at least one set point is calculated with the aid of a model-predictive optimization algorithm. This primarily relates to grade change and break set points, which means acceleration of grade changes and starting up following stoppages or break times can be achieved. In particular, the temperature of the drying cylinders in the actual drying section can be changed and/or readjusted only relatively slowly. Shortening the readjustment time from one grade to the next, and also the optimization of break set points with the object of being able to start up again as quickly as possible and at the same time keeping the energy losses during the break time as low as possible, are further means of raising the production rate and reducing the specific energy consumption.

In a further embodiment, plant limits or parameter value limits are generated from calculated variables or variables derived from the online model and/or are fixedly predefined and/or predefined by the plant manager and taken into account when calculating a set point. Variables derived from the online model are, for example, dew point temperatures. Taking these limiting values into account can, amongst other things, ensure that the calculated set points can also be implemented on the actual paper machine.

In a further embodiment, at least one sensor assigned to a parameter measures the parameter value and, in the event of a deviation of the measured value from the computed value of the parameter, outputs a warning signal. In this way, extended plant monitoring is achieved, for example as to whether valves which should be closed during normal operation are open. If this is so, for example a visually emphasized text message "Valve open!" can be output on a display unit. Also conceivable alternatively or additionally are other forms of visual or acoustic signal generation, which can also be switched in a graduated manner, depending on the difference between measured value and computed value so that, in the event of a large discrepancy which could point to a malfunction, "the alarm bells ring" literally. In this way, the method according to various embodiments not only ensures the maintenance of the detected or calculated potential savings by means of monitoring the measured values but also ensures increased safety during the operation of the paper machine.

Controllers for larger plants, comprising a plurality of parts —such as paper machines—are generally constructed in several stages. There are normally subordinate controllers, to which set points are predefined by a higher-order device. Here, the set points can be momentarily applicable set points or functions of time (set point variations).

As a rule, what are known as Level-2-systems calculate set points by means of online optimization algorithms which, in turn, fall back on online models of the plant to be controlled. The online models are frequently mathematical-physical models. In some cases, the models have parameters which can no longer practically be modeled physically but have to be determined empirically. Examples of such parameters are heat transfer coefficients, frictional values and the like. The empirical parameters are generally preset during the commissioning phase—to some extent based on additional off-line measurements—and adapted during plant operation and/or displayed by (adaptive) empirical models. One example of such adaptive empirical models is neural networks.

A controller of a paper machine according to various embodiments represents such a Level-2-system. The method according to various embodiments can be part of a general operating method running on the controller.

By means of the method according to various embodiments, off-line optimization calculations relating to the plant-specific representation of the paper machine-specific influences can be carried out in a straightforward way. In particular if further variables are incorporated in the representation of the results, the model-based Level-2-system according to various embodiments can also be used as a soft sensor for displaying non-measurable values. various embodiments thus not only permit detection of potential savings but also lead to an improved understanding of the plant.

If the Level-2-system is connected online to the paper machine, beneficial values for the parameters can also be set by means of the controller on the paper machine.

Advantageously, at least one set point is automatically predefined to an actuating element assigned to the corresponding parameter or an associated control device of the paper machine. Thus, the Level-2-system can be used not only as a "suggestion system" but also as a "control system" with regard to set points calculated by means of the algorithm to optimize a weighted mean between the specific energy consumption and throughput. Here, the set points can be predefined directly to an actuating element but, as a rule, they are supplied to a control device belonging to the DCS.

These control devices can be constructed as model-based controllers, which determine their actuating variable by using a model of the control section controlled thereby. Model-based controllers can also be constructed, for example, as model-predictive controllers which, as such, are generally known (see, for example, the technical article "Modellbasierte prädiktive Regelung in der industriellen Praxis" [Model-based predictive control in industrial practice], by Rainer Dittmar and Bernd-Markus Pfeiffer, which appeared in at Automatisierungstechnik, vol. 54 (2006), Issue 12, pages 590-601). If physical modeling is not possible or not practical for part of the plant (for example the effort required for this is too high), "Advanced Process Control" systems are used in the prior art, which have the form of model-predictive controllers (MPC) and which are based on completely empirically determined dynamic process models. As a rule, the identification of these models is carried out off-line or in a calibration phase but not during continuous operation. However, online identification methods are also known.

At least the expanded drying section of the paper machine is controlled by the Level-2-system, "controlled" being used here in the context of various embodiments in the general sense of "controlled". It should therefore remain open whether control in the narrower sense or regulation is implemented. In addition, the configuration of the subordinate controllers in the context of various embodiments is of lesser importance. They can be simple controllers, for example, or cascaded controllers. A configuration as a distributed control system (DCS) is also possible.

The Level-2-system according to various embodiments can thus be used both for off-line "what when?" calculations and also linked in online and, for example, predefine set points for relevant actuating elements at regular time intervals (for example every 30 seconds) to the DCS/QCS system (QCS=quality control system). Depending on the form of configuration of various embodiments, a combination of at least two of the following objectives can be achieved:
lowering the specific energy consumption,
increasing the throughput,
increasing the production times or the production rate,
accelerating grade changes and starting up after stoppages or break times,
improved plant overview,
diagnosing the state of the plant with output of warnings,
analyzing the plant operation with the display of plant limits and/or warnings.

FIG. 1 shows a schematic representation of a paper machine 1, the representation being limited to the parts of the plant that are essential to various embodiments. These are, firstly, the drying section 2 with pre-dryer section 3, after-dryer section 4 and size press 5, the influence of the wet press 6 on the drying of the paper web 13 likewise being modeled as well. In addition, the drying section 2 includes a heat recovery system 7 and a steam and condensate system 8. All the parts of the plant can have a plurality of sensors 9 for picking up an extremely wide range of measured values (amongst others for the parameters calculated in the method according to various embodiments), only one sensor 9 in the heat recovery system 7 being represented in the figure. The sensors 9 supply the measured values to a controller 14 of the paper machine 1, which has suitable means 12—such as input and output means, working memory, processor etc.—for carrying out the method according to various embodiments. The parts of the plant can also have actuating elements 10, which can be driven by the controller 14 either directly or via a higher-order control device 11. The precise form of the configuration of the control devices 11—for example as model-predictive controllers—is not important to the teaching of various embodiments. Likewise, the set points to be predefined to the actuating elements 10 by the controller 14 can be transferred, for example at regular time intervals (for example every 30 seconds), to a DCS/QCS ("Distributed Control System/Quality Control System").

The pre-dryer section 3 and the after-dryer section 4 usually have a plurality of drying groups (drying cylinders of a steam or drying group have the same steam pressure), for which a mass and energy balance is calculated, advantageously individually in each case. Since it is likewise advantageous, in addition to the calculated mass and energy balances and the specific energy consumption, to incorporate still further variables into the representation of the results, it is preferred, for reasons of clarity, not to display all the results in one representation but to offer a user a plurality of views, in which in each case only an extract is represented. Here, a plurality of views can also relate to the same part of the plant, for example in a representation of pre-dryer section 3, size press 5 and after-dryer section 4, one view can refer to results (and possibly further variables) relating to the paper web 13, one to the hood air and a further one to the application of size.

FIG. 2 illustrates the fundamental functioning of the method according to various embodiments in a diagram. Here, parameters 15 relevant to the drying of a paper web are input into a model 17 of the drying section of a paper machine. The model 17 takes into account the paper machine-specific influences of the parameters 15 and, for the parameters 15, calculates values 16 and, for the individual parts of the plant, in each case calculates at least one mass and energy balance 20 and then, from the latter, the specific energy consumption 21.

By means of an optimization algorithm 18—starting, for example, from the calculated values 16—it is also possible to calculate set points 19, which are then for example transferred from the controller 14 to a control device 11 associated with the respective set point (or the corresponding parameter), see FIG. 1. The representation of the results 20, 21 can then be carried out in tabular form or graphically—as already outlined extensively above.

In summary, various embodiments relate to a method and to a model-based controller for controlling at least one part of a paper machine, to a paper machine having such a controller, to a computer program for carrying out the method, and to a computer program product on which the computer program is stored. In order to permit improved or optimized operation of an "expanded drying section" of a paper machine—comprising the "actual" drying section, possibly subdivided into pre-dryer section and after-dryer section with size press located in between, a steam and condensate system, an exhaust heat recovery system, a wet press and the white water—a model covering the aforementioned parts of the plant is proposed, by means of which, by using values for the parameters relevant to the drying, mass and energy balances for the parts of the plant and also the specific energy consumption in the drying section are calculated.

What is claimed is:

1. A method for controlling at least one part of a paper machine comprising an online model of the following plant units: a drying section, a heat recovery system, a steam and condensate system, wherein the method comprises:
   drawing a distinction in the online model between the following four material streams:
   moist paper,
   moist air,
   steam and condensate mixture of substantially pure water, and
   process water with different glycol contents,
   calculating, in the online model, a mass and energy balance for all the material streams in each of:
   the drying section,
   the heat recovery system, and
   the steam and condensate system,
   calculating a specific energy consumption from the mass and energy balances, and
   displaying at least one of the mass and energy balances and the specific energy consumption.

2. The method according to claim 1, wherein values are calculated:
   for the moist paper material stream in relation to the parameters comprising:
   temperature,
   mass flow,
   absolute humidity, and
   relative humidity;
   for the moist air material stream in relation to the parameters comprising:
   temperature,
   volume flow,
   mass flow,
   energy flow,
   absolute humidity,
   relative humidity, and
   dew point;
   for the steam and condensate material stream in relation to the parameters comprising:
   temperature,
   pressure,
   percentage of steam,
   mass flow, and
   energy flow; and
   for the process water material stream in relation to the parameters comprising:
   temperature,
   mass flow, and
   energy flow.

3. The method according to claim 1, wherein
   a computed value of at least one parameter in the online model is assigned to the measured value from an associated sensor and
   the online model is adapted by means of a comparison between computed value and measured value.

4. The method according to claim 1, comprising:
   modeling paper machine-specific influences on the drying of a paper web of at least one of the parameters comprising:
   temperature and humidity of process feed air,
   temperature and humidity of process exhaust air,
   white water temperature,
   machine speed,
   steam pressures in main steam group, and
   differential pressures relating to secondary steam groups, and calculating set points for at least one of the parameters.

5. The method according to claim 1, wherein the value of at least one parameter is fixed and, for the parameters the values of which are not fixed, set points are determined by means of an optimization algorithm, in particular to optimize a weighted mean between specific energy consumption and throughput.

6. The method according to claim 1, wherein for at least one of the parameters a value range is predefined, within which a predefinabie number of values is fixed successively, and for the parameters the values of which are not fixed, for each of the values within the value range, in each case set points are determined by means of an algorithm in order to optimize a weighted mean between specific energy consumption and throughput.

7. The method according to claim 4, wherein the set points are calculated at regular time intervals or upon a request from a plant manager.

8. The method according to claim 4, wherein at least one set point is automatically predefined to an actuating element assigned to the appropriate parameter or an associated control device of a DCS ("Distributed Control System") of the paper machine.

9. The method according to claim 4, wherein a variation over time of at least one set point is calculated with the aid of a model-predictive optimization algorithm.

10. The method according to claim 4, comprising:
at least one of;
generating plant limits or parameter value limits from calculated variables or variables derived from the online model,
fixedly predefining plant limits or parameter value limits, and
predefining plant limits or parameter value limits by a plant manager, and
taking the plant limits or parameter value limits into account when calculating a set point.

11. The method according to claim 1, wherein at least one sensor assigned to a parameter measures the parameter value and wherein, in the event of a deviation of the measured value from the computed value of the parameter, a warning signal is output.

12. A model-based controller for controlling at least one part of a paper machine comprising an online model of the following plant units: a drying section, a heat recovery system, a steam and condensate system, wherein the model based controller is operable:
to draw a distinction in the online model between the following four material streams:
moist paper,
moist air,
steam and condensate mixture of substantially pure water, and
process water with different glycol contents,
to calculate, in the online model, a mass and energy balance for all the material streams in each of:
the drying section,
the heat recovery system, and
the steam and condensate system,
to calculate a specific energy consumption from the mass and energy balances and
to display at least one of the mass and energy balances and the specific energy consumption.

13. A paper machine having at least one controller according to claim 12.

14. A computer program product comprising a non-transitory computer readable medium storing instructions which when executed on a computer:
provide for an online model of the following plant units: a drying section, a heat recovery system, a steam and condensate system, and
perform the steps of
drawing a distinction in the online model between the following four material streams:
moist paper,
moist air,
steam and condensate mixture of substantially pure water, and
process water with different glycol contents,
calculating, in the online model, a mass and energy balance for ail the material streams in each of:
the drying section,
the heat recovery system, and
the steam and condensate system,
calculating a specific energy consumption from the mass and energy balances and
displaying at least one of the mass and energy balances and the specific energy consumption.

15. The model based controller according to claim 12, wherein values are calculated:
for the moist paper material stream in relation to the parameters comprising:
temperature,
mass flow,
absolute humidity, and
relative humidity;
for the moist air material stream in relation to the parameters comprising:
temperature,
volume flow,
mass flow,
energy flow,
absolute humidity,
relative humidity, and
dew point;
for the steam and condensate material stream in relation to the parameters comprising:
temperature,
pressure,
percentage of steam,
mass flow, and
energy flow; and
for the process water material stream in relation to the parameters comprising:
temperature,
mass flow, and
energy flow.

16. The model based controller according to claim 12, wherein
a computed value of at least one parameter in the online model is assigned to the measured value from an associated sensor and
the online model is adapted by means of a comparison between computed value and measured value.

17. The model based controller according to claim 12, wherein the computer program product is further executable to:
model paper machine-specific influences on the drying of a paper web of at least one of the parameters comprising:
temperature and humidity of process feed air,
temperature and humidity of process exhaust air,
white water temperature,
machine speed,
steam pressures in main steam groups, and
differential pressures relating to secondary steam groups, and calculate set points for at least one of the parameters.

18. The model based controller according to claim 12, wherein the value of at least one parameter is fixed and, for the parameters the values of which are not fixed, set points are determined by means of an optimization algorithm, in particular to optimize a weighted mean between specific energy consumption and throughput.

19. The model based controller according to claim 12, wherein for at least one of the parameters a value range is predefined, within which a predefinable number of values is fixed successively, and for the parameters the values of which are not fixed, for each of the values within the value range, in each case set points are determined by means of an algorithm in order to optimize a weighted mean between specific energy consumption and throughput.

20. The model based controller according to claim 17, wherein the set points are calculated at regular time intervals or upon a request from a plant manager.

\* \* \* \* \*